US010336233B2

(12) United States Patent
De Jesus et al.

(10) Patent No.: US 10,336,233 B2
(45) Date of Patent: Jul. 2, 2019

(54) FLOOR MAT WITH BOTH INTERLOCKING AND SNAP FIT FEATURES

(71) Applicant: FORD GLOBAL TECHNOLOGIES, LLC, Dearborn, MI (US)

(72) Inventors: Juan De Jesus, Mexico City (MX); Leonardo Alonso Huitron, Naucalpan de Juarez (MX); Paul Vredeveld, Tecumseh, MI (US); Alberto Emmanuel Ballesteros, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/800,735

(22) Filed: Nov. 1, 2017

(65) Prior Publication Data
US 2019/0126801 A1 May 2, 2019

(51) Int. Cl.
*B60N 3/04* (2006.01)
*A47G 27/02* (2006.01)

(52) U.S. Cl.
CPC .......... *B60N 3/048* (2013.01); *A47G 27/0293* (2013.01); *B60N 3/044* (2013.01); *B60N 3/046* (2013.01); *B60Y 2410/113* (2013.01)

(58) Field of Classification Search
CPC .... B60N 3/046; B60N 3/044; A47G 27/0293; B60Q 3/51; B60Q 3/20
USPC ...................................... 296/97.23; 362/488
See application file for complete search history.

(56) References Cited

U.S. PATENT DOCUMENTS

| 3,401,975 | A | * | 9/1968 | Oger ..................... B60N 3/044 296/97.23 |
| 4,287,693 | A | * | 9/1981 | Collette ............. A47G 27/0212 52/177 |
| 4,769,895 | A | | 9/1988 | Parkins |
| 5,830,560 | A | | 11/1998 | Koa |
| 6,155,629 | A | | 12/2000 | Sherman |
| 6,817,649 | B1 | | 11/2004 | Stanesic |
| 7,648,187 | B2 | | 1/2010 | Hoffman et al. |
| 7,727,612 | B2 | | 6/2010 | Haraguchi et al. |
| 7,797,890 | B2 | * | 9/2010 | Thrush .................... E04F 15/10 446/116 |
| 10,059,242 | B1 | * | 8/2018 | Willobee ............... B60N 3/048 |
| 2009/0239021 | A1 | * | 9/2009 | Wise ................. A47G 27/0293 428/58 |
| 2012/0011791 | A1 | * | 1/2012 | Lach ................. A47G 27/0293 52/309.3 |
| 2016/0229323 | A1 | | 8/2016 | Veik et al. |
| 2018/0229637 | A1 | * | 8/2018 | Parra Becerra ........ B60N 3/046 |
| 2018/0339631 | A1 | * | 11/2018 | Willobee ............... B60N 3/048 |

FOREIGN PATENT DOCUMENTS

| DE | 4023126 A1 | 3/1991 |
| DE | 102016101548 A1 * | 8/2016 ............. B60N 3/046 |

OTHER PUBLICATIONS

English Machine Translation of DE4023126A1.

* cited by examiner

*Primary Examiner* — Jason S Morrow
(74) *Attorney, Agent, or Firm* — Vichit Chea; King & Schickli, PLLC

(57) ABSTRACT

A floor mat includes a first section, a second section, an interlocking feature and a snap fit feature. The first section includes a flap. The interlocking feature and the snap fit feature connect the flap of the first section with the second section.

9 Claims, 6 Drawing Sheets

FLOOR MAT WITH BOTH INTERLOCKING AND SNAP FIT FEATURES

TECHNICAL FIELD

This document relates generally to the motor vehicle equipment field and, more particularly, to a new and improved floor mat having two sections held together by a combination of interlocking and snap fit features.

BACKGROUND

It is known in the art to provide all weather floor mats adapted for protecting the second row foot wells and the raised transmission tunnel wall that divides those foot wells. Typically, such a floor mat is provided in two sections to allow for reduced weight and size so as to increase handling convenience.

The two sections need to be joined together in order to provide the continuous floor mat that protects the underlying carpet in the second row foot wells and across the raised transmission tunnel from dirt, slush, snow, water and other debris. State of the art floor mat designs of this type have relied on various structures to interconnect the two floor mat sections. Unfortunately, those interconnecting structures have not been effective to resist movement between the two sections in three mutually perpendicular directions and, accordingly, have not provided a completely secure connection. As a result, in state of the art floor mats, one section has a tendency to shift with respect to the other exposing a portion of the underlying carpet to dirt, slush, snow, water and other debris.

This document relates to a new and improved floor mat including an interlocking feature in combination with a snap fit feature that are effective to secure the two sections of the floor mat together in a far more effective manner. More specifically, the interlocking feature and the snap fit feature function together to resist movement between the two floor mat sections in three mutually perpendicular directions for greater connection security and enhanced carpet protection.

SUMMARY

In accordance with the purposes and benefits described herein, a new and improved floor mat is provided. That floor mat comprises a first section having a flap, a second section, an interlocking feature connecting the flap and the second section and a snap fit feature also connecting the flap and the second section. In one or more of the many possible embodiments, the snap fit feature may be provided outboard the interlocking feature.

The interlocking feature may include a first set of at least one ridge on the flap and a second set of at least one ridge on the second section. The first set of at least one ridge and the second set of at least one ridge fit together in an interdigitated configuration when the two sections of the floor mat are connected together.

The snap fit feature may include a first locking tab, a second locking tab, a first receiver and a second receiver. When the two sections of the floor mat are interconnected together, the first locking tab is received and held in the first receiver and the second locking tab is received and held in the second receiver.

Still further, the first section of the floor mat may include a first pan and a first sidewall. Similarly, the second section of the floor mat may include a second pan and a second sidewall. In such an embodiment, the second set of at least one ridge, the first receiver and the second receiver may all be carried on the second sidewall. The first set of at least one ridge, the first locking tab and the second locking tab may all be carried on the first flap of the first section. The flap on the first section of the floor mat may extend continuously over a top of a transmission tunnel of a motor vehicle in which the floor mat is provided.

Stated another way, the floor mat may comprise a first section, a second section, an interlocking feature and a snap fit feature. Both the interlocking feature and the snap fit feature connect the first section to the second section when the floor mat is installed on the floor of a motor vehicle. Advantageously, the interlocking feature and the snap fit feature lie within a single plane and function to resist movement between the first section and the second section of the floor mat in three mutually perpendicular directions. As a result, a secure connection is provided between the first section and the second section of the floor mat and the two sections of the floor mat will not shift with respect to one another. Accordingly, the underlying carpet remains covered and no areas are exposed to dirt, slush, snow, water and other debris tracked into the motor vehicle by the motor vehicle passengers.

In one or more embodiments of the floor mat, the snap fit feature is outboard of the interlocking feature. In one or more embodiments of the floor mat, the interlocking feature includes a first set of at least one ridge on the flap and a second set of at least one ridge on the second section. The first set of at least one ridge and the second set of at least one ridge fit together in an interdigitated configuration when the first and second sections are connected together. In one or more embodiments, the one or more of the ridges may have a profile of a truncated triangle.

In one or more embodiments, the snap fit feature includes a first locking tab, a second locking tab, a first receiver and a second receiver. When installed in a motor vehicle, the first locking tab is received and held in the first receiver and the second locking tab is received and held in the second receiver.

In the following description, there are shown and described several preferred embodiments the floor mat. As it should be realized, the floor mat is capable of other, different embodiments and its several details are capable of modification in various, obvious aspects all without departing from the floor mat as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the floor mat and together with the description serve to explain certain principles thereof.

Reference will now be made in detail to the present preferred embodiments of the arm floor mat, examples of which are illustrated in the accompanying drawing figures.

DETAILED DESCRIPTION

Figure 1:
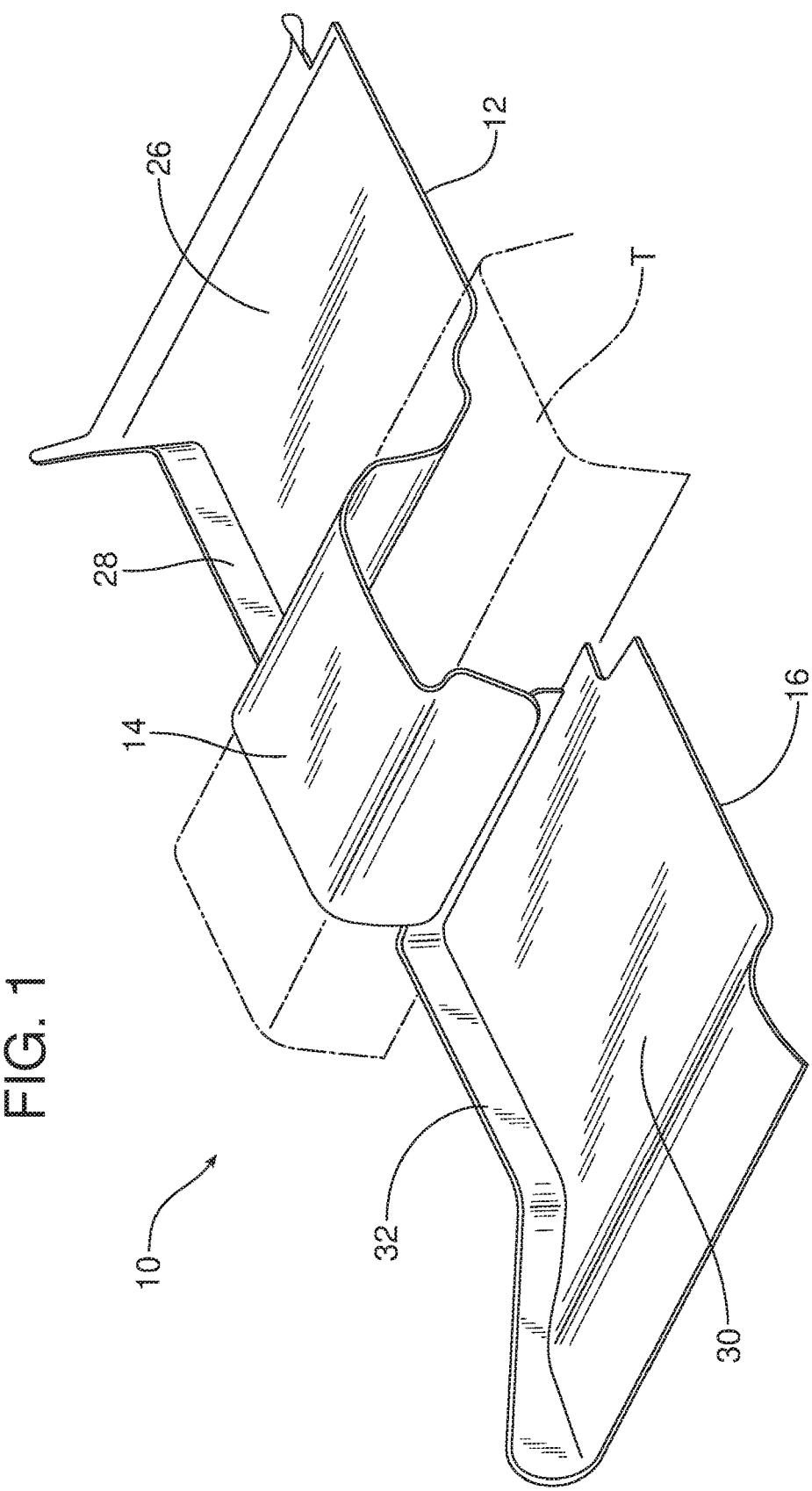
FIG. 1 is a perspective view of the floor mat illustrating the first and second sections of the floor mat connected together by the cooperating interconnecting feature and snap fit feature.
Figure 2:
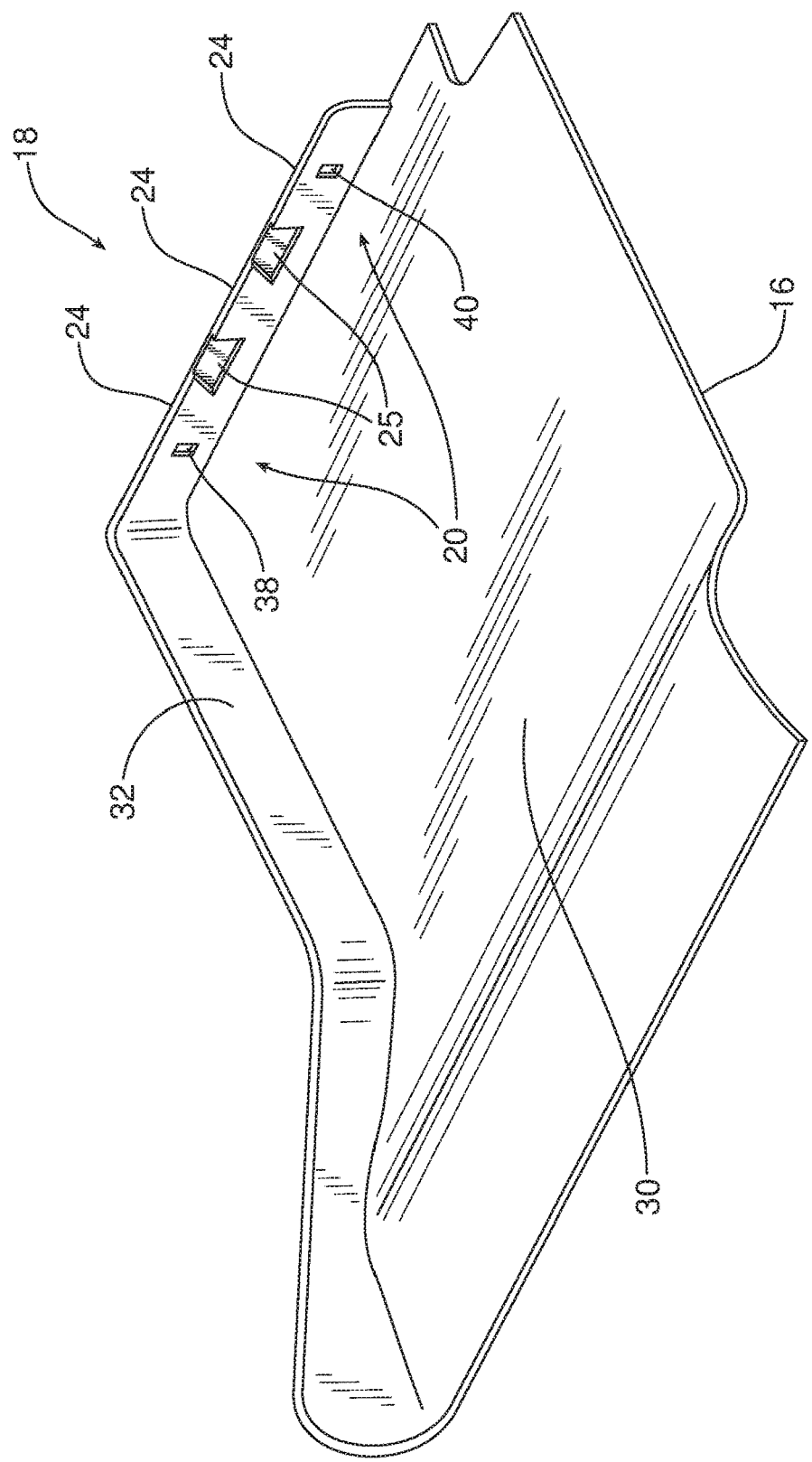
FIG. 2 illustrates the second set of at least one ridge, the first receiver and the second receiver carried on the second sidewall of the second section.
Figure 3:
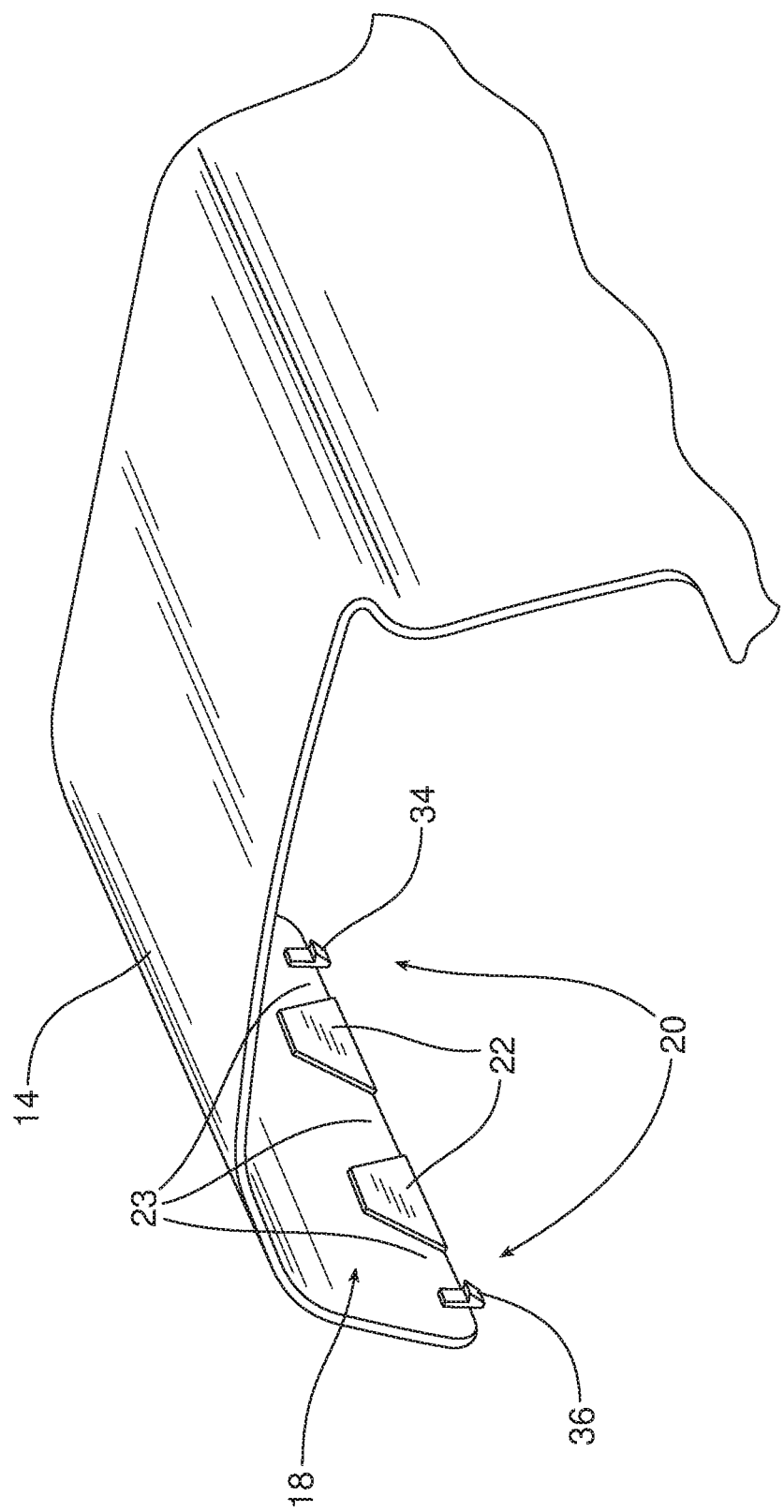
FIG. 3 illustrates the first set of at least one ridge, the first locking tab and the second locking tab carried on the flap of the first section.

Reference is now made to FIG. 1 which illustrates a new and improved floor mat 10. As illustrated in FIG. 1, the floor mat 10 includes a first section 12, having a flap 14, and a second section 16. The flap 14 may be an integral part of the first section 12 so as to provide seamless one-piece construction.

As will become apparent from the following description, the first section 12 and the second section 16 are securely connected together by an interlocking feature, generally designated by reference numeral 18 and a snap fit feature, generally designated by reference numeral 20. The interlocking feature 18 and snap fit feature 20 are illustrated in detail in FIGS. 2-6.

As best illustrated in FIGS. 2-5, the interlocking feature 18 includes a first set of at least one ridge 22 provided on the flap 14 and a second set of at least one ridge 24 provided on the second section 16. In the illustrated embodiment, the first set includes two ridges 22 and the second set includes three ridges 24.

In the illustrated embodiment, the first section 12 includes a first floor pan 26 for collecting and holding, dirt, slush, snow, water and debris, and a cooperating first upstanding sidewall 28. Similarly, the second section 16 includes a second floor pan 30 for collecting dirt, slush, snow, water and other debris and a second upstanding sidewall 32. In the illustrated embodiment, the second set of spaced ridges 24 are provided on the second sidewall 32.

As best illustrated in FIGS. 2, 3, 4 and 6, the snap fit feature 20 includes a first locking tab 34 and a second locking tab 36 carried on the flap 14 and a first receiver 38 and a second receiver 40 carried on the second section 16 and, more particularly, the second sidewall 32 of the second section. In the illustrated embodiment, the snap fit feature 20, including the first locking tab 34, second locking tab 36, first receiver 38 and second receiver 40 is positioned on the first section 12 and second section 16 outboard of the interlocking feature 18, including the first set of at least one ridge 22 and the second set of at least one ridge 24.

When the floor mat 10 is installed in a motor vehicle, the first section 12 is connected to the second section 16 by the interlocking feature 18 and the snap fit feature 20. More specifically, the flap 14 of the first section 12 is extended across the raised transmission tunnel T illustrated in phantom line in FIG. 1. Next, interlocking feature 18 and the snap fit feature 20 are connected to secure the first section 12 with the second section 16. More specifically, the first locking tab 34 and the second locking tab 36 projecting from the edge of the flap 14 are aligned, respectively, with the first receiver 38 and the second receiver 40 provided on the second sidewall 32 of the second section 16. The first locking tab 34 and the second locking tab 36 are then inserted and fully seated in the respective first receiver 38 and second receiver 40. When fully connected, the first shoulder 42 on the first locking tab 34 engages the margin 46 of the first receiver 38 to ensure that the first tab remains locked in the first receiver (see FIG. 6). The second locking tab 36 includes a similar shoulder to provide the same function with respect to the second receiver 40.

Figure 5:
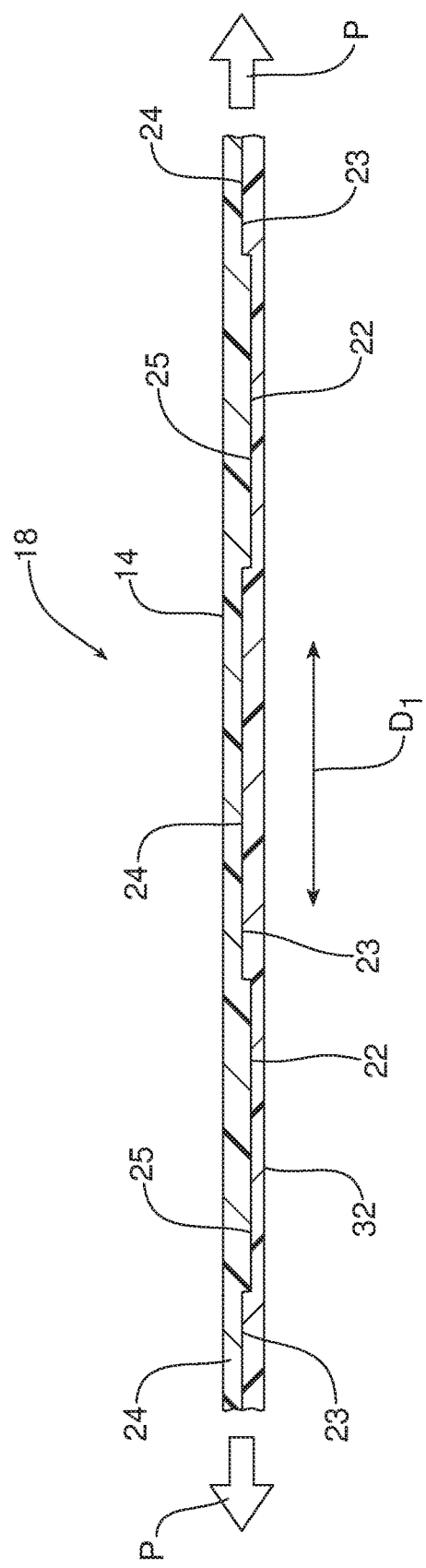
FIG. 5 is a detailed cross-sectional view illustrating the interlocking feature which resists movement between the first and second sections in the first or longitudinal direction within the single plane of the interlocking feature and the snap fit feature.

When aligning the locking tabs 34, 36 in the locking tab receivers 38, 40, one simultaneously aligns the first set of at least one ridge 22 on the flap 14 with the second set of at least one ridge 24 on the second sidewall 32. Further, one simultaneously interconnects the first set of at least one ridge 22 with the second set of at least one ridge 24 when interconnecting the first locking tab 34 and second locking tab 36 with the first receiver 38 and second receiver 40. More specifically, as best illustrated in FIG. 5, the first set of at least one ridge 22 is offset with respect to the second set of at least one ridge so that the two sets of ridges fit together in an interdigitated configuration. As should be appreciated from reviewing FIG. 5, when properly interconnected, the first set of ridges 22 nest in the valleys 25 adjacent the second set of ridges 24 and the second set of ridges 24 all nest in the valleys 23 adjacent the first set of ridges 22. As should be appreciated, one or more of the ridges 22, 24 have a profile of a truncated triangle with tapering sidewalls that aid in alignment, fit snugly together and resist separation when the first locking tab 34 is locked in the first receiver 38 and the second locking tab 36 is locked in the second receiver 40.

Figure 4:
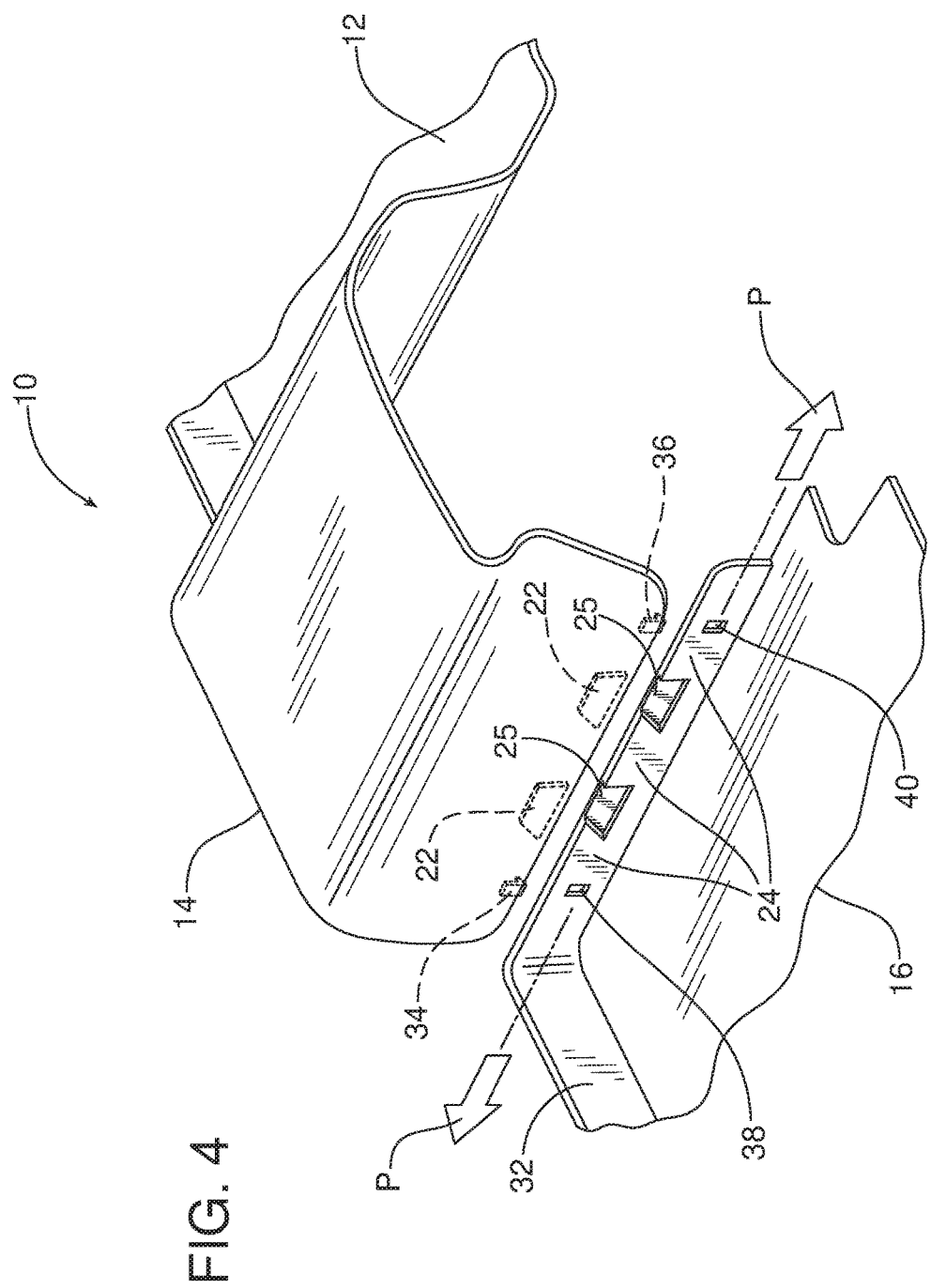
FIG. 4 is a detailed perspective view illustrating the interconnection of the first and second sections of the floor mat and showing how the interlocking feature and the snap fit feature lie within a single plane and resist movement between the first section and the second section in three mutually perpendicular directions for a secure connection.
Figure 6:
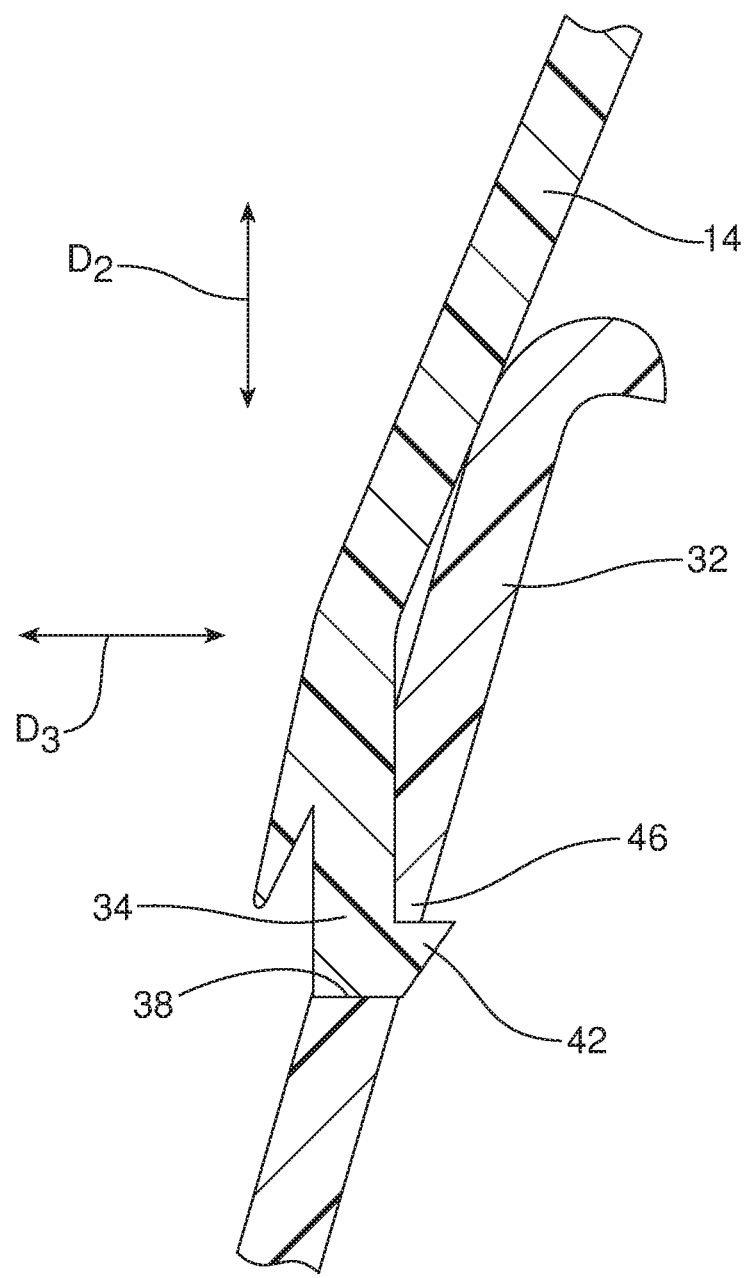
FIG. 6 is a detailed schematic illustration of the snap fit feature illustrating how the snap fit feature resists movement between the first section and the second section in the second and third perpendicular directions.

As should be appreciated from viewing FIGS. 4-6, the interlocking feature 18 and the snap fit feature 20 function together to provide a secure connection between the first section 12 and the second section 16 of the floor mat 10. More specifically, as best illustrated in FIG. 4, the interlocking feature 18 and the snap fit feature 20, when secured together or interconnected, both lie within a single plane P. Further, the interconnected interlocking feature 18 and snap fit feature 20 function to resist movement between the first section 12 and the second section 16 in three mutually perpendicular directions. More specifically, as illustrated in FIG. 5, the interlocking feature 18 resists movement between the first section 12 and the second section 16 in a first direction $D_1$ along the plane P When installed in a motor vehicle, that first direction $D_1$ substantially corresponds to the longitudinal or X axis of the motor vehicle in accordance with the SAE Vehicle Axis System.

As illustrated in FIGS. 4 and 6, the snap fit feature 20 resists movement between the first section 12 and the second section 16 in the second direction $D_2$ and the third direction $D_3$. When the floor mat 10 is installed in the motor vehicle, the second direction $D_2$ substantially corresponds to the vertical or Z axis direction while the third direction $D_3$ substantially corresponds to the lateral or Y axis direction of the SAE Vehicle Axis System.

Since the interlocking feature 18 and the snap fit feature 20 resist movement between the first section 12 and the second section 16 in the three mutually perpendicular directions $D_1$, $D_2$, $D_3$, it should be appreciated the first and second sections of the floor mat 10 are interconnected together in the most secure way possible. Thus, the first section 12 and the second section 16 remain connected together under any foreseeable use conditions so as to provide continuous uninterrupted protection of the underlying carpet. Since the first section 12 and the second section 16 are securely held together, they will not separate and expose areas of the carpet to dirt, slush, snow, water and other debris.

In addition, it should be appreciated that the flap 14 extends all the way across and over the carpet overlying the raised transmission tunnel T. Advantageously, the flap 14 provides a continuous, seamless protective cover for the carpet on the raised transmission tunnel T. This continuous, seamless flap 14 better protects the carpet on the raised transmission tunnel from slush, snow, water, dirt and other debris than prior art mat designs that include a seam along the top of the transmission tunnel T. Significantly, when the interlocking feature 18 and snap fit feature are secured together, the end of the flap 14 overlies the second pan 30 within the second sidewall 32 of the second section 16. As a result, any dirt, slush, snow, water or other debris falling under the force of gravity or otherwise from the flap 14 will be collected by the first floor pan 26 or the second floor pan 30 at either side of the transmission tunnel T.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A floor mat, comprising:
   a first section having a flap;
   a second section;
   an interlocking feature connecting said flap and said second section wherein said interlocking feature includes a first set of at least one ridge on said flap and a second set of at least one ridge on said second section, said first set of at least one ridge and said second set of at least one ridge fitting together in an interdigitated configuration; and
   a snap fit feature connecting said flap and said second section.

2. The floor mat of claim 1, wherein said snap fit feature is outboard said interlocking feature.

3. The floor mat of claim 1, wherein said snap fit feature includes a first locking tab, a second locking tab, a first receiver and a second receiver wherein said first locking tab is received and held in said first receiver and said second locking tab is received and held in said second receiver.

4. The floor mat of claim 3, wherein said first section includes a first pan and a first sidewall and said second section includes a second pan and a second sidewall.

5. The floor mat of claim 4, wherein said second set of at least one ridge, said first receiver and said second receiver are carried on said second sidewall.

6. The floor mat of claim 5, wherein said flap extends continuously over a top of a transmission tunnel of a motor vehicle in which said floor mat is provided.

7. A floor mat, comprising:
   a first section;
   a second section;
   an interlocking feature connecting said first section to said second section, said interlocking feature including a first set of at least one ridge on said first section and a second set of at least one ridge on said second section, said first set of at least one ridge and said second set of at least one ridge fitting together in an interdigitated configuration; and
   a snap fit feature connecting said first section to said second section wherein (a) said snap fit feature is outboard of said interlocking feature and (b) said interlocking feature and said snap fit feature lie within a single plane and resist movement between said first section and said second section in three mutually perpendicular directions for a secure connection.

8. The floor mat of claim 7, wherein said snap fit feature includes a first locking tab, a second locking tab, a first receiver and a second receiver wherein said first locking tab is received and held in said first receiver and said second locking tab is received and held in said second receiver.

9. The floor mat of claim 8, wherein at least three ridges of said first set of at least one ridge and said second set of at least one ridge have a profile of a truncated triangle.

* * * * *